(12) United States Patent
Kim

(10) Patent No.: US 6,546,002 B1
(45) Date of Patent: Apr. 8, 2003

(54) SYSTEM AND METHOD FOR IMPLEMENTING AN INTELLIGENT AND MOBILE MENU-INTERFACE AGENT

(76) Inventor: Joseph J. Kim, 1375 Montecito Ave., #17, Mountain View, CA (US) 94043

( * ) Notice: Subject to any disclaimer, the term of this patent is extended or adjusted under 35 U.S.C. 154(b) by 0 days.

(21) Appl. No.: 09/346,788

(22) Filed: Jul. 7, 1999

(51) Int. Cl.[7] .................................... H04L 12/28
(52) U.S. Cl. ......................................... 370/351
(58) Field of Search ........................... 370/350–354, 370/401, 402, 338; 345/327, 721, 700, 719; 709/232, 207, 315–317; 707/513, 103, 104; 725/110–113; 455/552–556, 426, 445, 414, 423, 401–403

(56) References Cited

U.S. PATENT DOCUMENTS

| | | | |
|---|---|---|---|
| 5,093,718 A | 3/1992 | Hoarty et al. | 358/84 |
| 5,155,806 A | 10/1992 | Hoeber et al. | 395/157 |
| 5,181,107 A | 1/1993 | Rhoades | 358/86 |
| 5,347,632 A | 9/1994 | Filepp et al. | 395/200 |
| 5,433,614 A | 7/1995 | Beye | 434/307 |
| 5,524,195 A | 6/1996 | Clanton, III et al. | 395/155 |
| 5,594,490 A | 1/1997 | Dawson et al. | 348/6 |
| 5,737,560 A | 4/1998 | Yohanan | 395/349 |
| 5,740,549 A | 4/1998 | Reilly et al. | 705/14 |
| 5,774,121 A | 6/1998 | Stiegler | 345/354 |
| 6,047,327 A | * 4/2000 | Tso et al. | 709/232 |
| 6,101,510 A | * 8/2000 | Stone et al. | 707/513 |
| 6,141,003 A | * 10/2000 | Chor et al. | 345/327 |

OTHER PUBLICATIONS

S.S. Chakraborty, Mobile Multimedia: In Context to ATM Transport and GSM/GPRS Mobile Access Networks, May 1995, IEEE Globecom 95, entire document.*

* cited by examiner

*Primary Examiner*—Kwang B. Yao
*Assistant Examiner*—Prenell Jones
(74) *Attorney, Agent, or Firm*—Pillsbury Winthrop LLP

(57) ABSTRACT

The present invention provides a system and method for using a mobile interface agent to dynamically access programs, applications, bookmarked URLs, IP addresses, telephone numbers, television channels, radio stations, user profiles, and the like that are specific to a user via any computer type device. The mobile interface agent can be accessible using any computer from any geographical location so long as the computer can be connected to a network. The mobile interface agent is basically an agent that allows the user to access documents, files, programs, applications, URL bookmarks, IP addresses, telephone numbers, television channels, radio stations, and other menu items from any computer. Moreover, the present invention relates to a per user based licensing model that allows the user to remotely access and use computer programs.

49 Claims, 15 Drawing Sheets

SYSTEM AND METHOD FOR IMPLEMENTING AN INTELLIGENT AND MOBILE MENU-INTERFACE AGENT

FIELD OF THE INVENTION

The present invention relates generally to the field of computer networks. More particularly, the present invention is directed to an information management and storage system and method. The present invention is further directed to a mobile interface agent that can be used to dynamically access resources stored either locally in the computer device or across a network including programs, applications, bookmarked URLs, user profiles, IP addresses, telephone numbers, television channels, radio stations, and the like that are specific to a user via any computer device. Moreover, the present invention relates to a per user based licensing model that allows the user to locally or remotely access and use computer programs from any computer device.

BACKGROUND OF THE INVENTION

Most computers and portable digital assistants (PDA) have an operating system (OS) such as MS-DOS, UNIX, Windows 98INT/CE, or Linux loaded thereon for managing basic operations. In general, an OS apportions the computer's main memory, handles requests, receives and transmits instructions to and from the input/output (I/O) devices, manages the flow of information into and out of the main processor and the I/O devices, and performs other tasks that are commonly known.

The OS is also used to organize and manage menu items such as software programs, applications, files, folders, documents, and the like that are stored on the computer or PDA. A user interface in an OS generally includes "pointers" to software programs, applications, files, folders, documents, and other menu items. A pointer in this context is a reference to a type of menu item that can be accessible on the computer, PDA or a server.

In the current versions of the Windows 98/NT (believed to be a registered Trademark of Microsoft Corp.) OS, pointers are commonly used to retrieve/access menu items. Pointers can be found in a "Start" menu bar on the Windows 98/NT user interface and includes a list of pointers to folders, files, and programs (e.g., word processing program, spreadsheet data file, personal software folder, etc.). For example, FIG. 2 illustrates a screen shot of a conventional Windows NT "Start" menu bar.

The "Start" menu bar's main function is to provide easy access to commonly used applications and files. The menu bar also has some basic configuration capability so that a user can personalize the pointer data by adding or removing pointer data found in the menu bar. However, the "Start" menu bar information and configuration for a particular user is limited to the personal computer on which the configuration and pointer information reside. Hence, a user using a different personal computer cannot dynamically recreate the configuration and pointer information stored on another personal computer. Further, the menu bar does not have any intelligence about a network connected to the personal computer so a user may not receive accessibility information about pointer data that may depend on a network connection. Even further, the current Windows "Start" menu bar information cannot be accessed across multiple operating systems or platforms such as on a Macintosh computer running MacOS or within a web browser.

Even further, the "Start" menu bar keeps no user information or profile data associated with the user of the menu bar. A user could save time if the menu bar kept certain user profile data, and applications linked to the menu bar could access this data. Hence, a user who accesses a word processor's Fax template could automatically have the word processor access data kept by the menu bar interface such as his name, address, and telephone number and automatically insert this information into the Fax template. Applications would simply be given some kind of interface such as a software API to query data stored by the menu bar interface, and the stored data could be assumed to be associated with the current user using the menu bar interface.

Computers in many environments are connected to a network such as a local area network (LAN), a metropolitan area network (MAN), or a wide area network (WAN). Computers on the network can conveniently manage and access software programs, applications, files, folders, documents, and the like from another computer or server. For example, most businesses store such menu items at a centralized location, e.g. central server, so that multiple users connected to the network can gain access to them.

Another popular and common use of a computer or PDA is to access information on the Internet. A web browser such as the Internet Explorer 4.0/5.0 (believed to be a registered Trademark of Microsoft Corp.) or Navigator (believed to be a registered Trademark of Netscape, Inc.) is loaded onto the computer or PDA so that the user can access web sites. The web browser is also used so that the user can receive and transmit data. Because the user may visit many web sites during a given session, each web browser allows the users to store and save the addresses (URLs) of commonly visited web sites. This is done by bookmarking them. The user bookmarks commonly visited web sites so that the user can create shortcuts for future use. As a result, the user does not have to type the complete URLs to access these sites.

It is not uncommon for many users to have multiple computers, PDAs, and other computer-related devices. Each individual computer or PDA may include specific menu items and bookmarks that do not exist in another computer or PDA. For example, a computer used at work may be the only device that includes a spreadsheet program while a computer used at home may be the only device that includes bookmarked URLs. Thus, the user will not have access to the bookmarks from the user's work computer and likewise, will not have access to the spreadsheet program from the user's home computer. As a result, this causes much inconvenience and inefficiency for the computer user.

Further, the bookmarks pointer data is specific to a particular output interface; specifically, the web browser. It would be desirable to have bookmarks that can attach various types of output applications for the pointer data contained in the bookmarks. It would also be desirable to be able to attach various types of interfaces to the bookmarks themselves instead of being tied as a feature of a web browser: an independent entity that can optionally attach various kinds of user interfaces such as some kind of intelligent agent using a graphical icon of a human-like figure (for children to interact with on a Windows 95/98 PC) or a voice activated and controlled menu system (for cellular telephones).

It is common for users to have two computers of two different OS's running an application such as Microsoft Word. In order to share a particular Microsoft Word data file, it is currently necessary in the prior art to manually export the file in the required format so that a computer using one OS can read the file of the computer using the other OS. Time would be saved if there existed a mechanism allowing files to be exported to the network in a format specified using mobile interface agent application data. When the mobile interface agent running on one OS changes to a computer running a different OS, the mobile interface agent can signal a server daemon to perform an OS conversion of the data and get the data file in the proper format. To the user, this process would be automatic and transparent since the user can simply click a data file, which is a pointer data in his/her mobile interface agent.

Currently, users may save a list of phone numbers on her personal computer's telephone directory software. Similarly, a user may go to a television guide web site and save a list of favorite television shows and times. Time and effort could be saved if the list of phone numbers were transparent to the user's telephone and the list of favorite television shows transparent and accessible to the user's television. In other words, besides the advantage of being cross platform, using the mobile interface agent system allows user profile, configuration and settings information to be handled intelligently by network services to export information between networks such as the Internet, cable television network, or telephone network. This allows not only cross platform advantages, but cross network advantages as well.

Most software programs and applications are currently licensed on either a node locked paradigm in which the software is usable on a per device basis or as a floating license in which a fixed number of licenses are available to a certain group of users limited by the number of concurrent users. In the case of node locked licensing, a user is generally not allowed to install a software program in multiple computers unless a software developer grants a license to the user for such use. Thus, most users cannot install the same software program on both their home and work computers unless the user purchases two identical programs (one for home and one for work). For floating licenses, the number of instances of program execution is tracked and any additional attempt to execute a program above the licensed limit is blocked by some kind of license manager. However, this method does not allow the tracking of the usage of specific users and involves guessing an optimal number of concurrent licenses to purchase so that users are not blocked from using the program while minimizing the cost of the licenses. Also, current licensing models are generally restricted by platform so that a user with a license for a software program is allowed to re-install the program when the user is changing/upgrading computers of the same platform. However, when the user is changing to a different platform such as from a Windows 98 device to an Apple MacOS device, the re-installation is not possible.

The trend in the future is that many software programs and the like may be licensed per user rather than per device/platform or number of concurrent users in a network. In this case, the user has a license to use such programs from any computer that is capable of running such programs. The present invention provides a system and method for implementing such a licensing model so that the user can access and run programs from any computer and from any geographical location.

Accordingly, the ability to dynamically access any software programs, files, documents, URL bookmarks, IP addresses, telephone numbers, television channels, radio stations, and the like from any computer is highly desirable. There is a need for a system and method that can provide access to such menu items and bookmarks using any computer.

SUMMARY OF THE INVENTION

It is an object of the present invention to provide a system and method that allows a user to access specific documents, files, programs, applications, URL bookmarks, IP addresses, telephone numbers, television channels, radio stations, and other menu items from any computer device located in any geographic location.

It is another object of the present invention to provide a system and method that allows a user to access specific documents, files, programs, applications, URL bookmarks, IP addresses, telephone numbers, television channels, radio stations, and other menu items using a mobile interface agent.

It is yet another object of the present invention to provide a system and method that allows different applications or services to share information between them.

It is another object of the present invention to provide a system and method that allows applications and services to access user profile information.

It is another object of the present invention to provide a system and method that allows applications and services to access user configuration and settings information.

It is another object of the present invention to provide a system and method that allows a mobile interface agent to be accessible by a user using any computer type device connected to the network.

It is another object of the present invention to provide a system and method that allows an intelligent platform or OS conversion of documents, files, or other data that are listed in mobile interface agent pointer data.

It is another object of the present invention to provide a system and method that allows a mobile interface agent to be accessible by a user using any digital communication device such as a cellular phone or a cable set top box that is connected to the network.

It is another object of the present invention to provide a system and method that allows a profile manager to export a user's profile, configuration, or settings data from one communications network such as the Internet to another network (such as the cellular phone network or the cable television network) to be accessible by mobile interface agents or other software or devices on the other network.

These and other objects of the present invention are obtained by providing a network based mobile interface agent. The mobile interface agent can be accessible using a computer, cable set top box, cellular phone, or other device from any geographical location. Once the mobile interface agent has been accessed, the user can gain access to any documents, files, programs, applications, URL bookmarks, and other pointer data that are available to the user. The mobile interface agent is basically an agent that allows the user to access documents, files, programs, applications, URL bookmarks, IP addresses, telephone numbers, television channels, radio stations, and other menu items from any computer that is connected to a network. The present invention also provides a method for remotely accessing and using computer programs from any computer device based upon a per user licensing model.

BRIEF DESCRIPTION OF THE DRAWINGS

These and other objects and advantages of the present invention will become apparent and more readily appreciated from the following detailed description of the presently preferred exemplary embodiment of the invention taken in conjunction with the accompanying drawings, of which.

DETAILED DESCRIPTION OF THE PREFERRED EMBODIMENTS

Figure 1A:
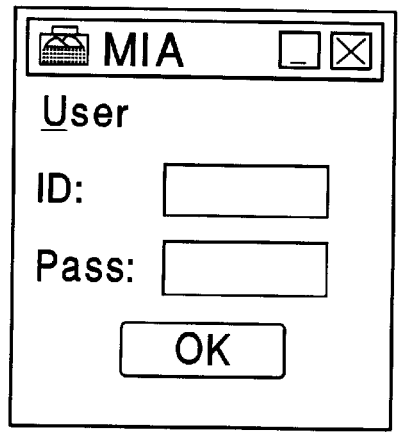
FIG. 1a illustrates a user login screen associated with a mobile interface agent in accordance with the present invention.

The preferred embodiments of the present invention will now be described with reference to FIGS. 1–15, wherein like components/steps are designated by like reference numerals throughout the various figures. As noted above, conventional systems and methods for information management, retrieval, and storage can be inefficient and burdensome. The present invention overcomes the disadvantages of prior art systems and methods.

The present invention is directed to a mobile interface agent (MIA) that is used to store, distribute, and access information. The MIA is specifically used to access menu items (e.g., software programs, applications, files, folders, documents, telephone numbers, radio stations, television channels), URL bookmarks, and user profile data. The MIA is also used to periodically update or query user profile data, facilitate the sharing of memory and data structures between applications/services both local and remote, allow various types of user interfaces to be attached (voice menu system, human-like graphical icon, etc.) and perform intelligent multi-platform conversion of application data.

Figure 1B:
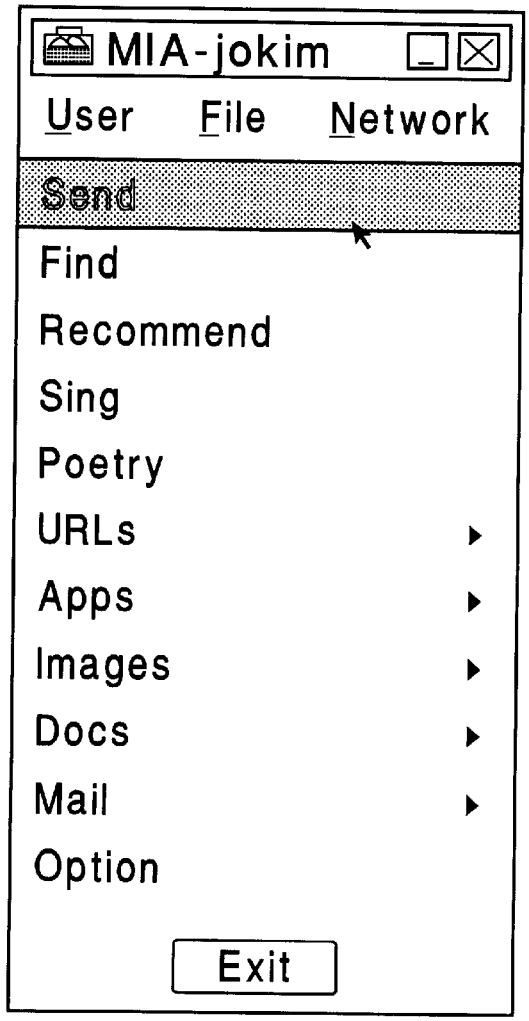
FIG. 1b illustrates a graphic interface used by a mobile interface agent once a user has logged on in accordance with the present invention.
Figure 2:
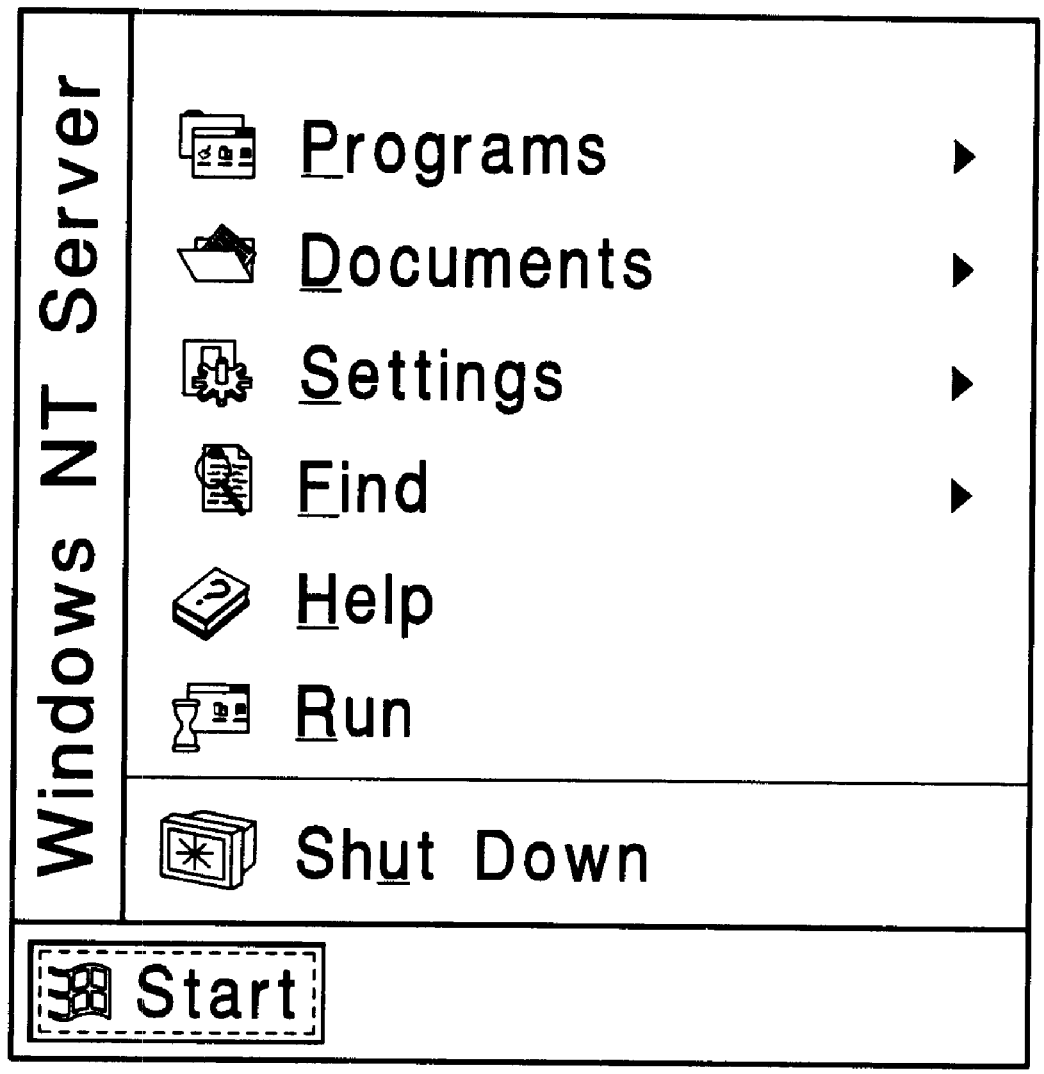
FIG. 2 illustrates a screen shot of a conventional Windows NT "Start" menu bar.

FIG. 1a illustrates an example of a user login screen associated with the MIA that is running as software on a computer or PDA device. FIG. 1a illustrates a conventional log in window showing a userid dialog box for inputting the userid code and a password dialog box for inputting the user's pre-selected password code. Once the correct userid and password codes are inputted into the two boxes, the user can now access and use the MIA. Once the user has successfully logged in, a graphical interface such as that illustrated in FIG. 1b is displayed to the user. Although FIG. 1b illustrates one such user interface that may be used in the present invention, other interfaces having different menu items than those illustrated herein may be included. As described in more detail later herein, the menu items/pointers shown in the user interface can be used to access and retrieve user specific resources and information.

Figure 3:
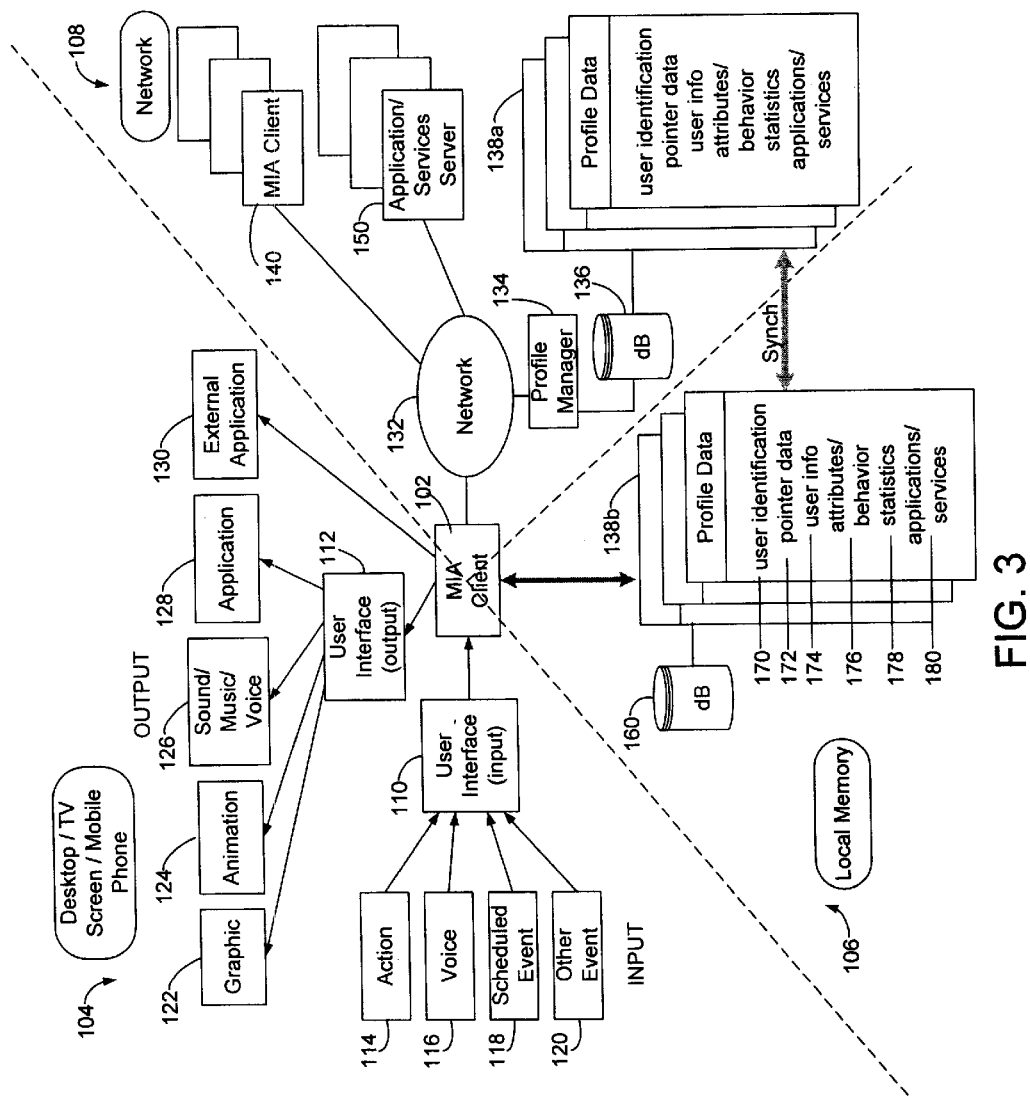
FIG. 3 illustrates a block diagram of an information and storage system implementing a mobile interface agent in accordance with the present invention.

FIG. 3 illustrates a block diagram of an information and storage system implementing an MIA in accordance with the present invention. The diagram illustrates three sections of the overall system. Section 104 represents user input/output (I/O) components of a user interface that can be used with the present invention. Section 106 represents a local memory that is used to store profile data for a particular user. Section 108 represents a network that is accessible by a computer (standalone, LAN, MAN, WAN), a PDA, a television (cable network), or a cellular phone (cellular network). Other networks that are accessible using different electronic devices that are now specifically mentioned herein can also be used with the present invention.

The MIA 102 interfaces the three sections (user I/O section 104, local memory section 106, network section 108) of the system. The MIA 102 is used to manage, access, retrieve, etc. information from the network and local memory. The MIA 102 is also used to initiate programs, applications, URL bookmarks, and other menu items, and can be implemented by way of software, firmware, or hardware.

The MIA 102 receives input commands through an input interface 110 and transmits output information through an output interface 112. Several methods of inputting commands via the MIA 102 can be used with the present invention. For example, the user can input commands via an action command 114. The action command 114 can be an action such as dragging and dropping a document, folder, etc., or selecting and clicking a specific menu item. The action command 114 is generally performed using a conventional keyboard, mouse, or pad. The user may also input commands to the MIA 102 via a voice command 116. A voice recognition program is commonly used to provide the capability to input the voice command 116. Examples of voice commands are the following: "MIA, what time is it?" or "MIA, find a Korean restaurant within 5 miles from my home." As another example for cellular phones, the MIA 102 could accept voice commands such as "Call Mom" or "Send phone conversation to my E-mail". Another type of input command that can be used is a scheduled event command 118. An example of the scheduled event command 118 includes launching certain applications at a specified time. Also, scheduled event command 118 can launch applications with a scheduled activity such as when a system backup program is initiated. Lastly, other event command 120 includes other types of commands that are commonly associated with external agents or modules that are unrelated to the user. Examples of such other event command 120 is when one MIA attempts to contact another MIA or when a request is received from another input source other than the user (e.g., profile manager 134).

The MIA 102 will also output information in different forms. The most notable output information is when MIA 102 launches an external application 130 such as Microsoft Word or Excel. The MIA 102 can also launch an application 128 via the output interface 112. Alternatively, the MIA 102 can itself drive output to the user that includes graphics 122, animation 124, and sound/music/voice 126. In certain embodiments, the MIA 102 will use appropriate types of output for the particular device that it is running on. For example, an audio message output for a cellular telephone, text output for a television screen, etc.

The MIA 102 is also coupled to a network 132 so that a user can access software programs, applications, files, folders, documents, services, URLs, , IP addresses, telephone numbers, television channels, radio stations, multimedia data, user profile data, other MIAs, and other items located remotely on the network. The MIA 102 can connect to the network 132 via the Internet, LAN, MAN, WAN, cable TV network, cellular phone network, etc. These items are stored either in an Application/Services (AppServ) server 150 or a master database 136. The AppServ server 150 is generally used by third parties to store applications that can be retrieved by the MIA 102 for the user or that execute other services on the network. When a computer device having the MIA 102 is connected to the network 132, the user can access applications/services from the AppServ 150 and profile data 138a from the master database 136. The user can access such information using any computer device from any geographic location so long as the user is able to connect to the network 132.

A profile manager 134 is connected to the network 132 and manages the contents of the master database 136, which includes profile data 138a. The profile manager 134 is responsible for managing and updating a user's profile data 138a that is stored in the master database 136. The master database 136 may be a part of the AppServ server 150 or can be a database in another server.

The local memory 106 includes a local database 160, which further includes a profile data 138b. Profile data 138a, 138b are stored in two locations; in the database master 136 and also in the local database 160 in a form of a "cached" copy. The profile data 138a, 138b must be synchronized for each MIA user.

When a particular user accesses the MIA 102 with a computer device for the first time on that device, a copy of the profile data 138a needs to be cached to the local memory 106. The MIA 102 will send a request to the profile manager 134 to send a cached copy of the profile data 138a to the local database 160 in order to create the profile data 138b. Information specific to a particular user is stored in the form of the profile data 138a, 138b.

When the MIA 102 is first used, it will contact the profile manager 134 to initialize itself. From then on, the MIA 102 will periodically update and synchronize itself with the profile data 138a. The profile manager 134 will track changes to the MIA 102 for a particular user.

As discussed earlier, the profile data 138a, 138b needs to be synchronized whenever possible. In certain instances when a network connection between the MIA 102 and the network 132 is not established, modifications and changes are stored in the local database 160 in the form of profile data 138b. Thereafter, when the network connection is reestablished, these modifications and changes in the local database 160 will be synchronized with the profile data 138a in the master database 136.

There may also be multiple MIAs 140 connected to the network 132. MIAs 140 may be on other computer devices or may be the same device. Each MIA is specific to a particular user or users. Network 132 can also be used to transfer information, files, data, applications, etc. between the MIA 102 and other remote MIAs 140. For example, the MIA 102 that is specific to user X could be used to transmit information to another user Y through MIA 140.

There are countless uses of the present invention. For example, the present invention can be used to conduct online financial transactions more efficiently. The MIA 102 can be used to allow multiple financial transactions using billing or bank information specific to the user. Another implementation would be to use the user profile on the network for online advertising or promotional services. Yet another implementation would be for an application to check whether any or certain other applications are running concurrently. For instance, a chat/messaging program can check to see if a user is running any educational or instructional applications before sending a message or chat request to the user. A word processing program could be used to automatically look into the user profile database and pull out the user's address and name and automatically insert this information into document templates for a letter, resume, etc.

The profile data 138a, 138b includes information relating to different fields of a particular user. These fields include a user identification 170, pointer data 172, user information 174, attributes/behavior 176, statistics 178, and applications/services 180. First, the profile data 138a, 138b includes a user identification field 170 for identifying a particular user. For example, identification codes such as "jokim123" or "11234678" can be used so that the MIA 102 can identify the code with a particular user.

Pointer data 172 can be used to quickly access an application, service, or other menu item. The pointer data 172 is similar to bookmarks used in web browsers, but can include more than URLs. For example, pointer data 172 can be used to retrieve and access documents in multiple formats, applications, application data, images in various formats, etc. The pointer data 172 can also be used to properly display pointers. For example, a URL pointer will include data of the browser location such that the browser is launched when a particular URL is requested. Pointer data 172 may exist either locally in the computer device or may exist as a resource accessible across a network.

User information 174 includes user information such as name, age, sex, address, occupation, salary, etc. This information is updated continuously as the data changes with the particular user.

Attributes/behavior information 176 includes information and data relating to the user interface. This information includes graphics and animation data specific to a particular user interface. For example, attributes and behavior data are used to create a user interface that is more personal to the user. Attributes include specific characteristics such as strength, charm, etc. that can be used to represent the user through the user interface. For example, an attribute could be a type of character such as a teddy bear that the user interface will use to graphically representation himself/herself. User behaviors such as playful, cute, or sarcastic can also be used to create an interface that interacts with other users in a particular manner. Inputting a particular attribute/behavior into the user interface allows the user to interject artificial intelligence to the user interface.

Statistics information 178 includes data such as how many times a particular menu item has been accessed or the number of times a particular advertisement has been accessed. Examples could include the number of cyber dollars used in e-commerce transactions or the amount of time the user was connected to the Internet.

Applications/services data 180 includes the MIA specific data required by the applications/services. This includes application and services data using the user interface, licensing information for applications, user and password information to access network services, and any data related to the MIA that an application or service would like stored.

Applications/services data 180 include any data required by a particular application or service associated with the menu user interface. For example, a service that provides children's stories in audio form through an animated character can be stored in the story data in a data structure of the MIA 102. Another example would be for an application such as Microsoft Word (believed to be a registered trademark of Microsoft, Inc.) to be able to store the number of times that the program was accessed and for how long. The previous example would be beneficial where the copy of Microsoft Word was stored across a network and the client using an MIA was paying to use the Microsoft Word application on a per usage basis.

Next, applications or services (such as external application 130)can have the ability to query or modify data relating to profile data fields. For example, when a user is running educational software via the MIA 102, the user can set a variable in the attribute data field 176 in the form of DO_NOT_DISTURB. This will prevent other MIAs 140 from interrupting the user until the user has completed the session. For example, when another MIA 140 user requests a chat session with the MIA 102 user during the educational session, the DO_NOT_DISTURB variable is presented to a chat application. The chat application can then disable notifications for incoming chat requests or queue the request until the MIA 102 user has completed the educational session. Other types of locks and semaphore data could similarly be established within the attribute or other fields.

Profile data 138*a* and 138*b* can also be shared among other applications or services. Using the example described above, a child's story service can store which stories were accessed by a particular user through the MIA 192. This type of information can be provided to, for example, a toy manufacturer, which can then use the information to send promotional materials relating to the story to the user. The promotional materials can be sent via the Internet or traditional mail.

Applications/services data 180 can be either external to MIA 102 or internal to the MIA 102. For example, a menu item can be built into the MIA 102 called "recommend," which can include options such as "Chinese restaurant." The MIA 102 can also check for other information regarding the user's preference from the profile data 138*a*, 138*b*. For example, the user may include in the profile data 138*a*, 138*b* that he/she enjoys spicy food. In this case, the name and location of a Chinese restaurant located near the user that serves spicy food will be displayed to the user. In another example, a menu item such as "Sing" can be used to animate the graphical user interface agent to play music or sing while the character is shown on the screen. As can be appreciated, there are countless applications and uses associated with the profile data 138*a*, 138*b*.

Figure 4:
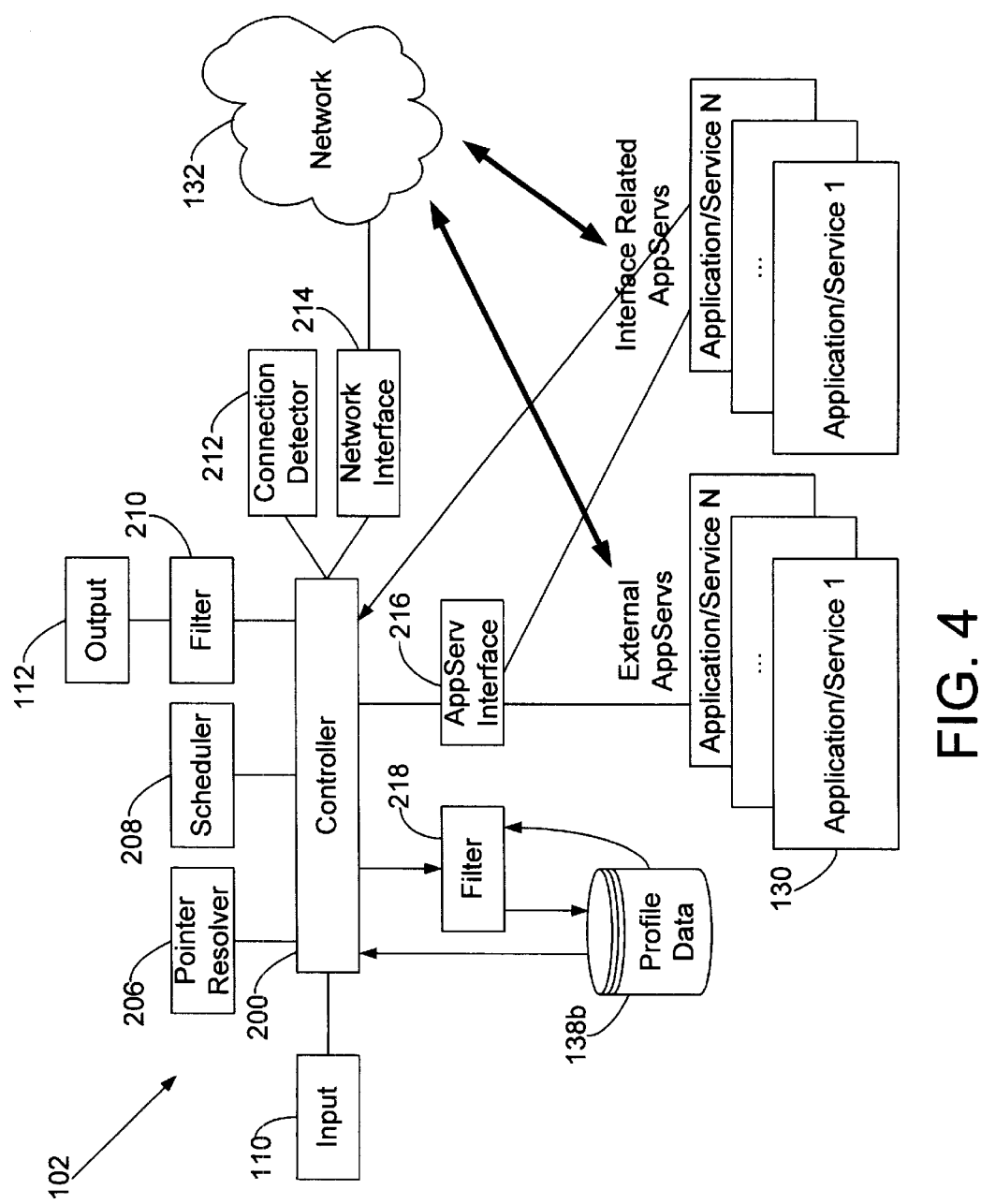
FIG. 4 illustrates a detailed block diagram of a mobile interface agent in accordance with the present invention.

FIG. 4 illustrates a detailed block diagram of an MIA in accordance with the present invention. In one embodiment of the present invention, the MIA 102 includes a controller 200, a pointer resolver 206, a scheduler 208, an output filter 210, a connection detector 212, a network interface 214, an application server interface (AppServ interface) 216, and a profile filter 218. The controller 200 is coupled to the input interface 110 and the output interface 112 via the output filter 210. The controller 200 receives input commands via the input interface 110 and decodes them into a more compact or standardized code. The controller 200 then processes the input commands in order to determine how to respond to them.

As discussed earlier, a pointer is a link/shortcut to an item such as a file, URL, IP address, telephone number, television channel, radio station, application, or service. When a user activates a pointer using one of the input commands, this command signal will be transmitted to the pointer resolver 206 via the input interface 110 and the controller 200. The pointer resolver 206 then receives the decoded input commands and accesses the corresponding item. For example, a URL access may launch a web browser or a word processing document will launch the word processing software/application.

The MIA 102 can also have menu functions or applications to schedule certain actions to be performed at specified periods. The scheduler 208 is used to queue requests for certain actions to be executed at specified periods. For example, the MIA 102 can have a backup application that backs up certain files weekly at a specified time, or an application that connects to the Internet and loads certain URL pages for later viewing, or a video cassette recorder that records a user's favorite television shows.

The output filter 210 is used to enable/disable functionality accessible by the user depending on various state information. For example, access to a particular service initiated via a menu item may be disabled using the filter 210 if a user has not paid for the particular service. As another example, when the connection detector 212 detects that there is no network connection, URL data present to the user as menu items may be made inaccessible or invisible to the user. As yet another example, a multicast video stream including various news segments could be sent to the user. The video stream would be tagged with special codes indicating what kind of news it represents. The output filter 210 would disable video news segments from being displayed on the user's output screen that did not match the user's indicated preferences stored in the profile data 138*b*. The network interface 214 is used to connect the controller 200 to the network 132.

Also depicted in FIG. 4 as part of the MIA 102 is the AppServ interface 216. Applications/services may share data or access a user's MIA profile data 138*b* via the profile data filter 218. The AppServ interface 216 is used to access profile data 138*b* by applications or services. AppServ interface 216 is preferably a software API with library functions used to write and read appropriate information. Security levels could also be implemented to allow the user to select the level and kind of information accessible to a particular application. Further, applications and services will have an interface to change, write and read data into a user's profile data 138*b*. In a similar way, an interface may also be provided to directly access profile data 138*a* stored on the network.

The controller 200 will write and read data to the profile data 138*b* for a particular user and also control access to this data by applications and services through the AppServ interface 216. The profile data filter 218 is used by the controller 200 to restrict various data from being written to the profile data 138*b*. The profile data filter 218 could also be used for non-security reasons. For example, if a multicast data stream were sending news information, then the profile data filter 218 could be programmed by the controller 200 based on rules supplied by the user's profile data 138b to only write certain news items to be read by the user at a later time.

Figure 5:
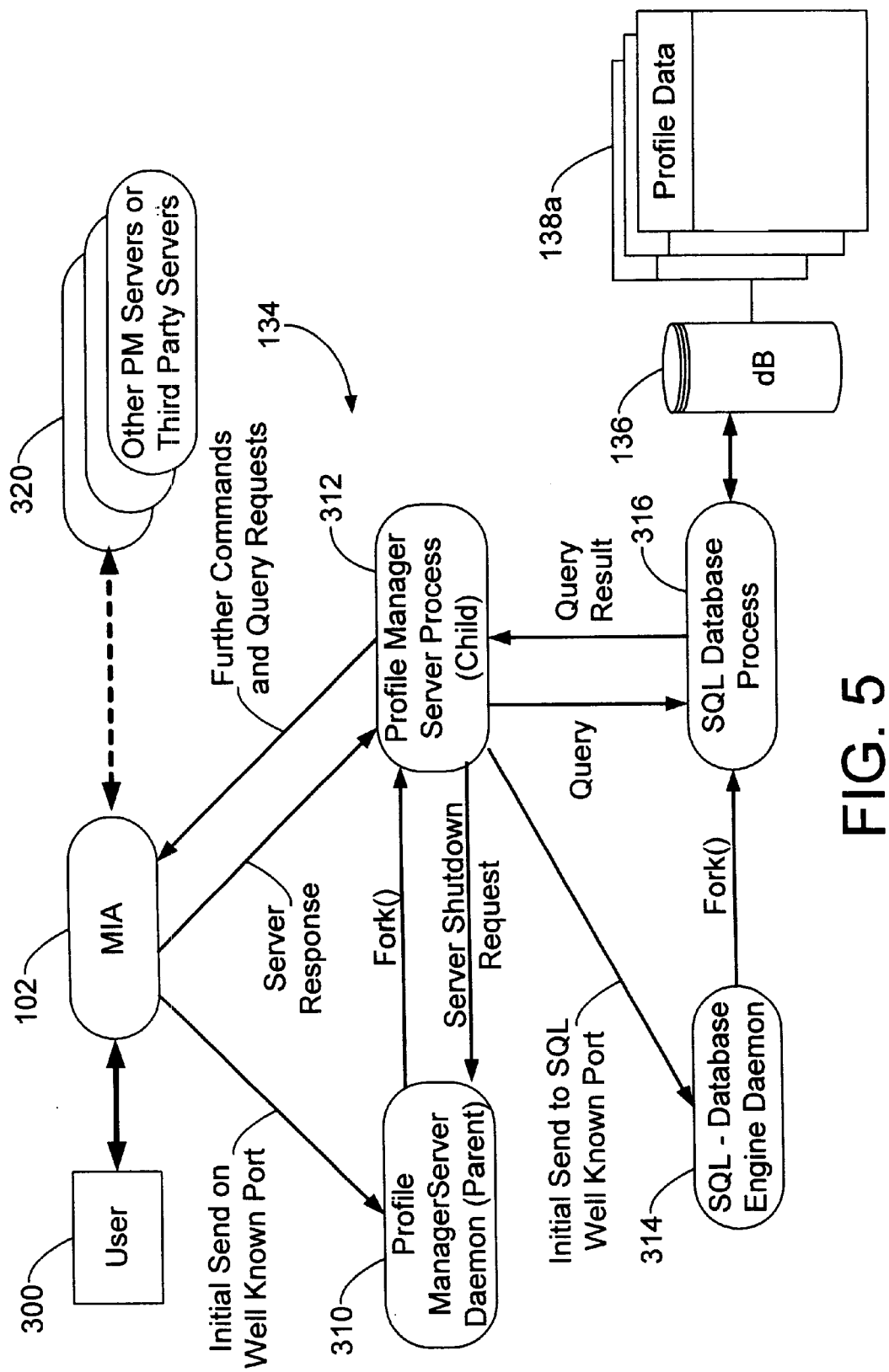
FIG. 5 illustrates a detailed diagram of a profile manager interacting with a mobile interface agent in accordance with the present invention.

FIG. 5 illustrates a detailed diagram of a profile manager interacting with a mobile interface agent in accordance with the present invention. The embodiment depicted herein is based on the UNIX BSD Sockets interface. One skilled in the art can easily implement other socket interfaces in accordance with the present invention.

When the MIA 102 and the profile manager 134 are interacting, the MIA 102 can obtain profile data from the profile manager 134 that is stored in the database 136. Also, profile data 138a can be updated and synchronized during such interaction. Finally, the MIA 102 can request information from the profile manager 134 such as the IP address of a server for a particular service, information about another user, online connection status for a list of contacts, etc.

During operation, a user 300 first inputs a command to the MIA 102. If such command requires the MIA 102 to interact with the profile manager 134, then an initial request is sent to the profile manager 134 from the MIA 102. This request is received by a profile manager server daemon 310 that is listening on a specific port. The parent daemon 310 then forks a new child process 312 to handle further interactions with the MIA 102. The child process 312 then handles subsequent requests from the MIA 102. The embodiment depicted herein uses a UNIX sockets system. In a similar fashion as the MIA 102 and profile manager server daemon 310 relationship, the profile manager child process 312 sends a request to a SQL database engine daemon 314 through another specific port. The database engine daemon 314 then forks a SQL database child process 316 to handle any queries from the profile manager child process 312. The SQL database child process 316 then interacts with the profile data database 136 and handles queries, directives, or modifications to the profile data 138a.

In some embodiments, the profile manager 134 uses a referral system such that a single server does not maintain all of the user profile data, but is rather distributed throughout multiple and redundant servers. The referrals will be passed back to the MIA 102 that will then query the next profile manager servers 320.

Figure 6:
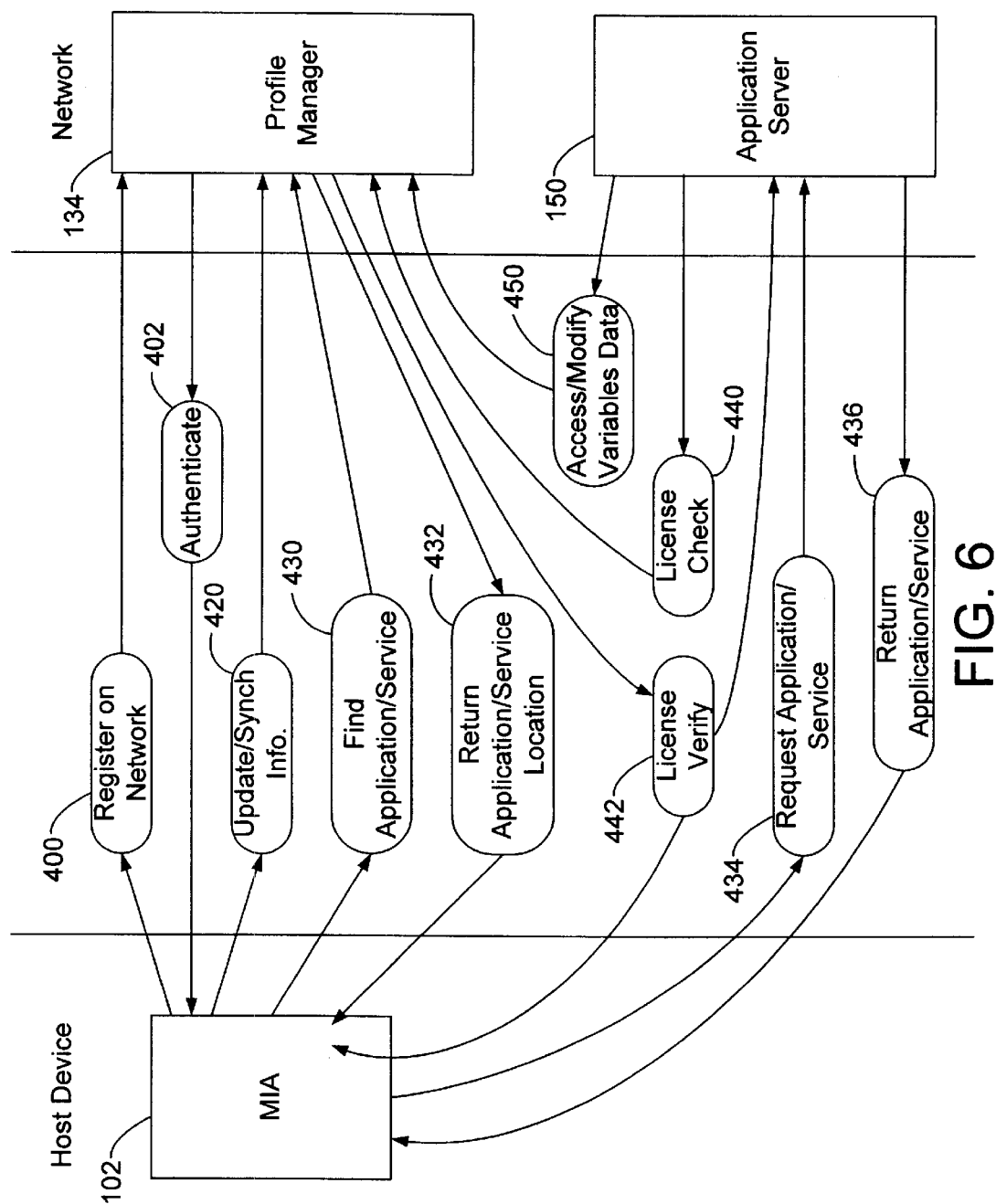
FIG. 6 illustrates the relationships between the mobile interface agent, the profile manager, and the application/services server in accordance with the present invention.

FIG. 6 illustrates the relationships between the MIA, the profile manager, and the application/services server in accordance with the present invention. The MIA 102, the profile manager 134, and the AppServ server 150 can interact directly/indirectly with each other.

The following examples describe a sample of the commands/responses between the MIA 102, profile manager 134, and the AppServ server 150. The MIA 102 will interact with the profile manager 134 when a user is connected to the network. The MIA 102 will transmit a request 400 to the profile manager 134 when a network connection is present and MIA needs to access the profile manager 134. The profile manager 134 will then respond to the MIA 102 in step 402 by authenticating the user code so that the MIA can have access to the profile manager 134. The MIA 102 can also transmit a request 420 to the profile manager 134 to update/synchronize the profile data.

When calling up applications/services, if the MIA 102 cannot locate the application/service requested on the local device, the MIA 102 will interact with the profile manager 134 before requesting the actual application/services from the AppServ server 150. For example, the MIA 102 will send a request 430 to the profile manager 134 to determine the location of the desired application/service on the network. The profile manager 134 will then respond in step 432 with the location of the application/service. The MIA 102 uses this information to send a request 434 to the AppServ server 150 to initiate the application/service. The AppServ server 150 will then initiate the application/service in the response 436.

One of the advantages of the present invention is that it allows a licensed program/service to be accessible for a particular user on a per user basis, without regard to platform, and anywhere in the world rather than on a particular machine. The licensing aspect of the present invention can be implemented in different ways. The preferred embodiment depicted herein shows the AppServ server 150 interacting with the profile manager 134 for a particular user's licensing information. Once the MIA 102 requests an application/service in request 434, the AppServ server 150 communicates with the profile manager 134 to check the licensing information in step 440. After the profile manager verifies that the user is licensed to use the requested application/service in step 442, this verification is sent to the AppServ server 150 and/or MIA 102. The AppServ server 150 then returns the application/service to the MIA 102. Alternatively, the MIA 102 could directly send the licensing information to the AppServ server 150. The AppServ 150 can also access and/or modify the profile data managed by the profile manager 134 in step 450.

Figure 7:
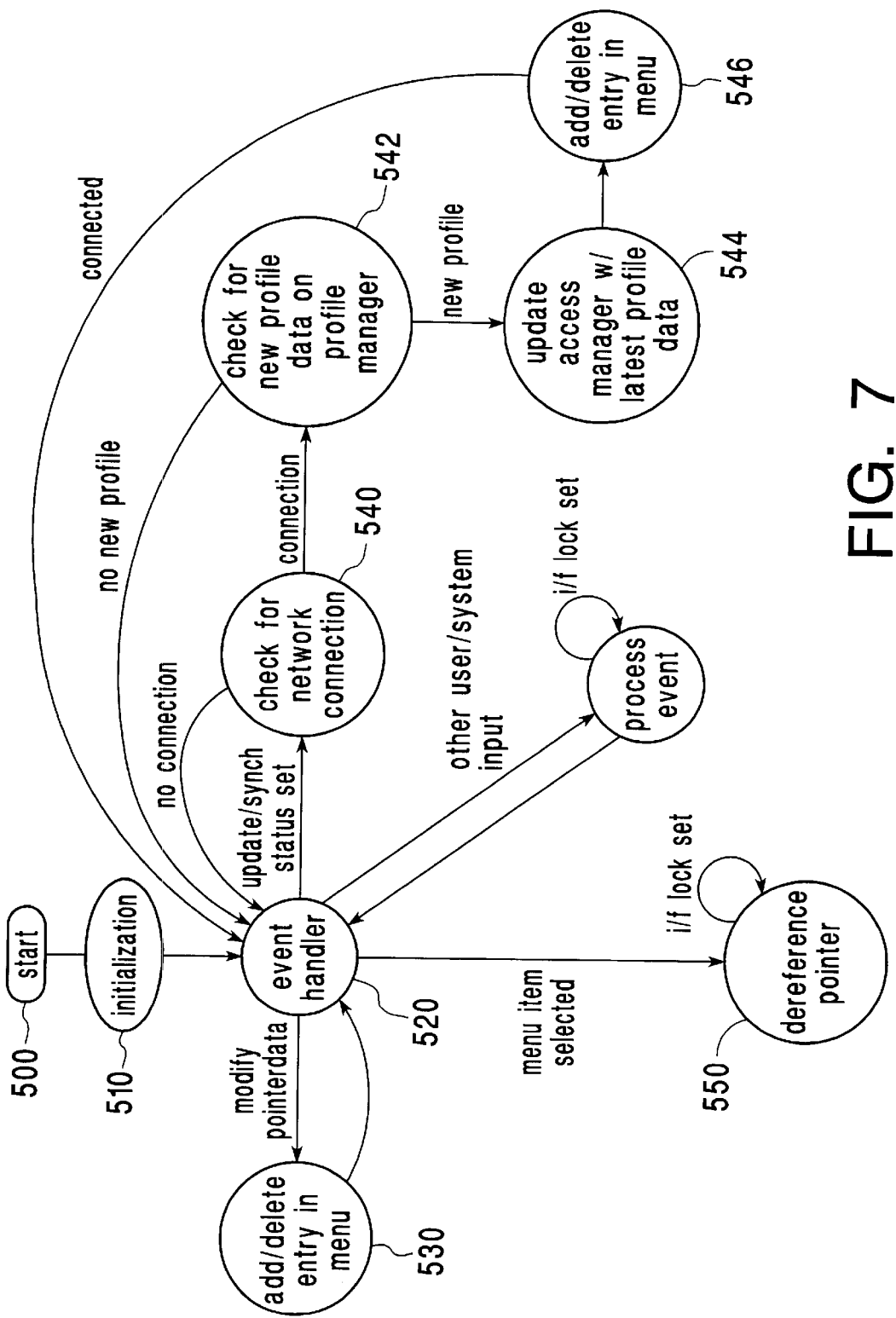
FIG. 7 illustrates a state diagram for the mobile interface agent in accordance with the present invention.

FIG. 7 illustrates a state diagram for the MIA in accordance with the present invention. After the start state 500, the MIA 102 enters the initialization state 510 where routine initialization is performed. In addition, MIA 102 will check to see whether it is connected to the network. If it is not connected to the network, then the MIA 102 may disable network dependent menu items such as URLs or applications that are on the network. Similarly, MIA 102 will check to determine what computer device it is on and based on the device's profile and list of registered applications, it will enable local applications and services that are available.

After the initialization state 510, the MIA 102 will then enter "event handler" state 520. In this state 520, the MIA 102 waits for an input such as an action command 114, voice command 116, scheduled event command 118, or other event command 120. When an input command is received by the MIA 102, the command is decoded. Then, based on the kind of input command received, an appropriate handler will be activated. For example, if a menu item is selected to be modified, added, or deleted, the MIA 102 will enter state 530, which will handle the modification of the menu item. Another example is when an update to the profile manager 134 is requested, then the MIA 102 will check for a network connection in state 540 and if the connection exists, it will check for the new profile data on the profile manager 134 in state 542. The MIA 102 will then update the profile manager 134 in state 544, and clear the request to update/synch profile information in state 546.

If the user selects a menu item, then the MIA 102 will enter state 550. In state 550, the MIA 102 will check the menu item and dereference a particular pointer. For example, if it is a URL, then the MIA 102 may launch a web browser with the requested URL. If, on the other hand, a local application is selected, then the MIA 102 will launch that particular application. For an application residing on the network, the MIA 102 will locate the application and send the appropriate request for the application to the AppServ server 150.

For some other kind of input command that does not utilize the menu item interface, an appropriate event handler will be called. This could take the form of, for example, the menu interface having a different graphical look, or it could be dragging the menu interface onto a trash can icon to log the user out of the MIA 102.

Figure 8:
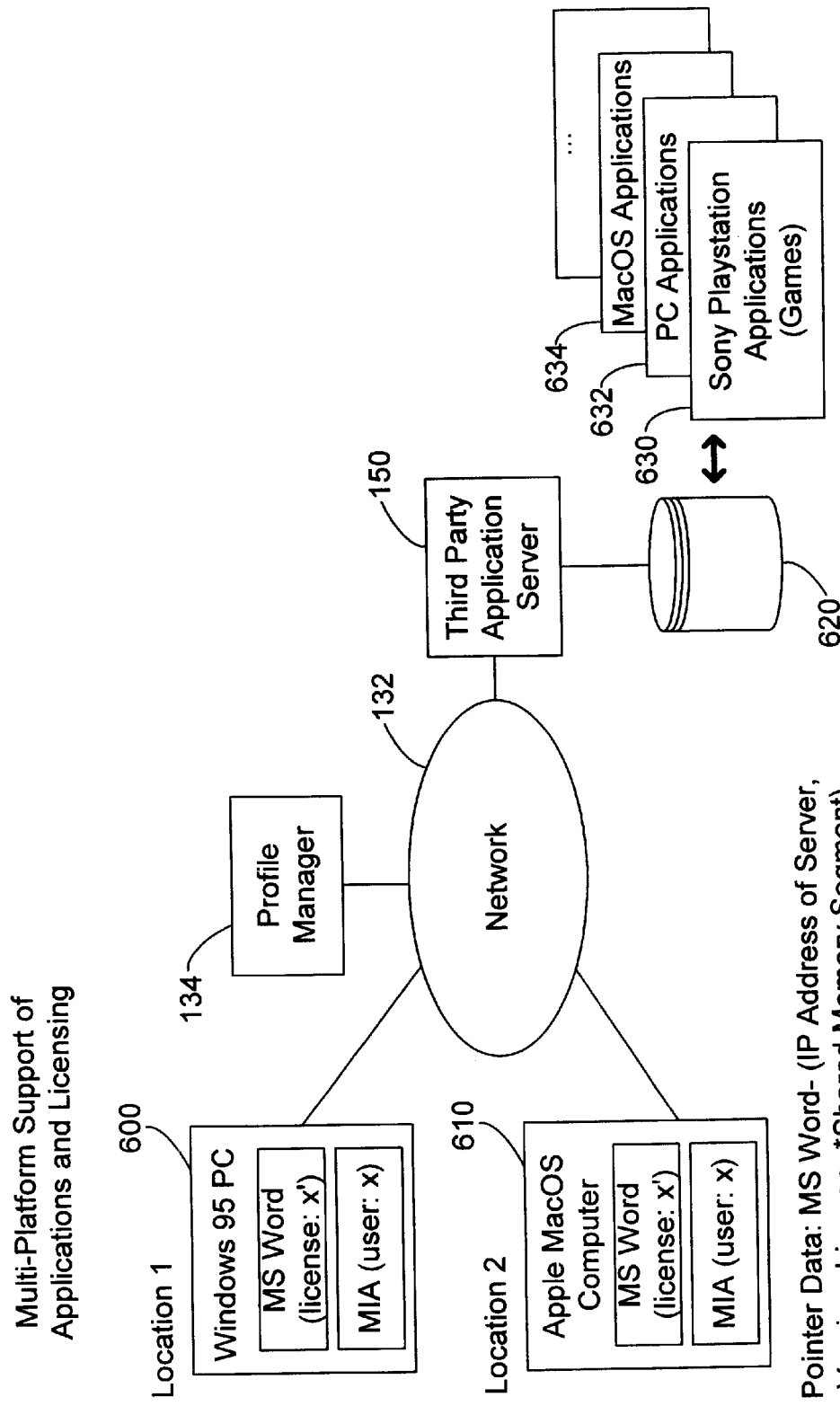
FIG. 8 illustrates an implementation of the present invention using multiple platforms.

FIG. 8 illustrates an implementation of the present invention using multiple platforms. A first platform 600 represents a computer device using a Windows based OS and the second platform 610 represents a computer using a Mac based OS. This figure illustrates how MIA 102 can be used both on a PC system 600 at a first location and also on an Apple Macintosh system 610 at a second location. Stated broadly, the user can connect to the network 132 and profile manager 134 using the MIA 102 from any computer and location.

When a user implementing the MIA 102 transfers from one computer device to another, then a pointer data that is accessible via network 132 may be valid and kept intact. However, pointer data to local applications may no longer be valid and will be filtered. Also, local applications may require their pointers readjusted if those local applications were resident on the local machine. For example, MIA 102 could have a pointer to Microsoft Word program in location 1 on the Windows 95 machine but can not resolve that pointer now that the user has moved to location 2 on the Apple Macintosh machine. Thus, the MIA 102 may search for Word locally on the Macintosh and adjust the pointer to point to the copy of Microsoft Word on the Macintosh. Further, this allows licensing to be carried with a particular user rather than the software. Hence, the MIA 102 can carry the licensing information for the user and may thus access Microsoft Word on any machine so long as his/her MIA has the proper license. Further, the application could alternatively be accessed via network.

In the case of a network-connected application or some kind of services, AppServ server 150 is connected to network 132, and the MIA 102 may access applications or services remotely. There may exist a plurality of AppServ server 150 on the network 132. Hence the MIA client 102 could request applications directly from some third party applications server 150. An example would be if MIA 102 was running on a Sony Playstation-like device and the user had purchased a license for a particular game. The third party application server (e.g., Sony server) can include a collection of Sony Playstation games 630, and the user can access a copy of the licensed game. Further, the application server could carry all types of applications or services including PC applications 632 or Apple MacOS applications 634. So the user in the second location could request Microsoft Word from the application server 150 and either download the application and run it locally or the application could be run remotely and the display interface returned to the user.

When a user saves a MS Word document from the Windows 95 PC 600 in the profile manager 134 and then later attempts to access the MS Word document from the Apple MacOS machine 610, another feature of MIA is that since it is able to detect/know the platform it is running on and has information about the format of documents that reside on the profile manager, MIA can request a document from the Apple MacOS machine 610 that is converted by the profile manager 134 to the proper format.

Figure 9:
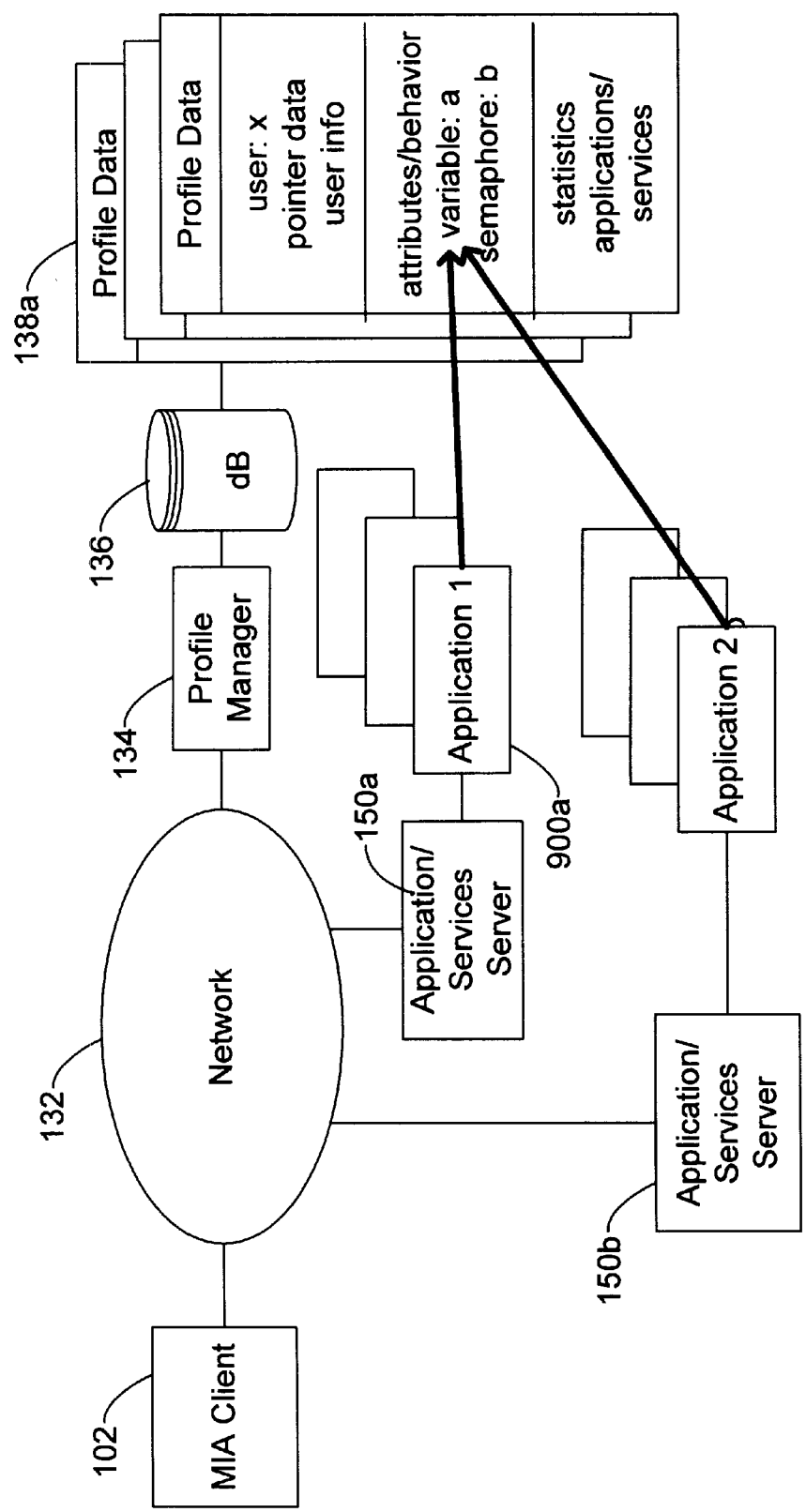
FIG. 9 illustrates an implementation of the present invention using multiple application/service servers.

FIG. 9 illustrates an implementation of the present invention using multiple application/service servers. The MIA 102, network 132, profile manager 134, profile database 136, and the profile data 138a are similar to those described with reference to FIG. 3. In FIG. 9, however, there is shown multiple AppServ servers 150a, 150b. This allows the MIA 102 user to access applications/services via any AppServ server that are connected to the network 132. Each AppServ server 150a, 150b can gain access to the profile data 138a for user information.

Further, applications or services can use MIA's user profile information to add value and functionality. Application 1 900a and application 2 900b can both access a user's profile data as well as shared locks, variables, memory segments, or other data stored in the profile data 138a. For example, a user could use an application 1 900a called global status that sets the user's status information such as "working" or "away" or "do not disturb". Other applications that describe a user's state information such as Mirabilis ICQ (e.g. application 2 900b), which tells other online user's a particular user's status could map a user's state information set by global status to ICQ status and automatically set ICQ status to match global status information.

Figure 10:
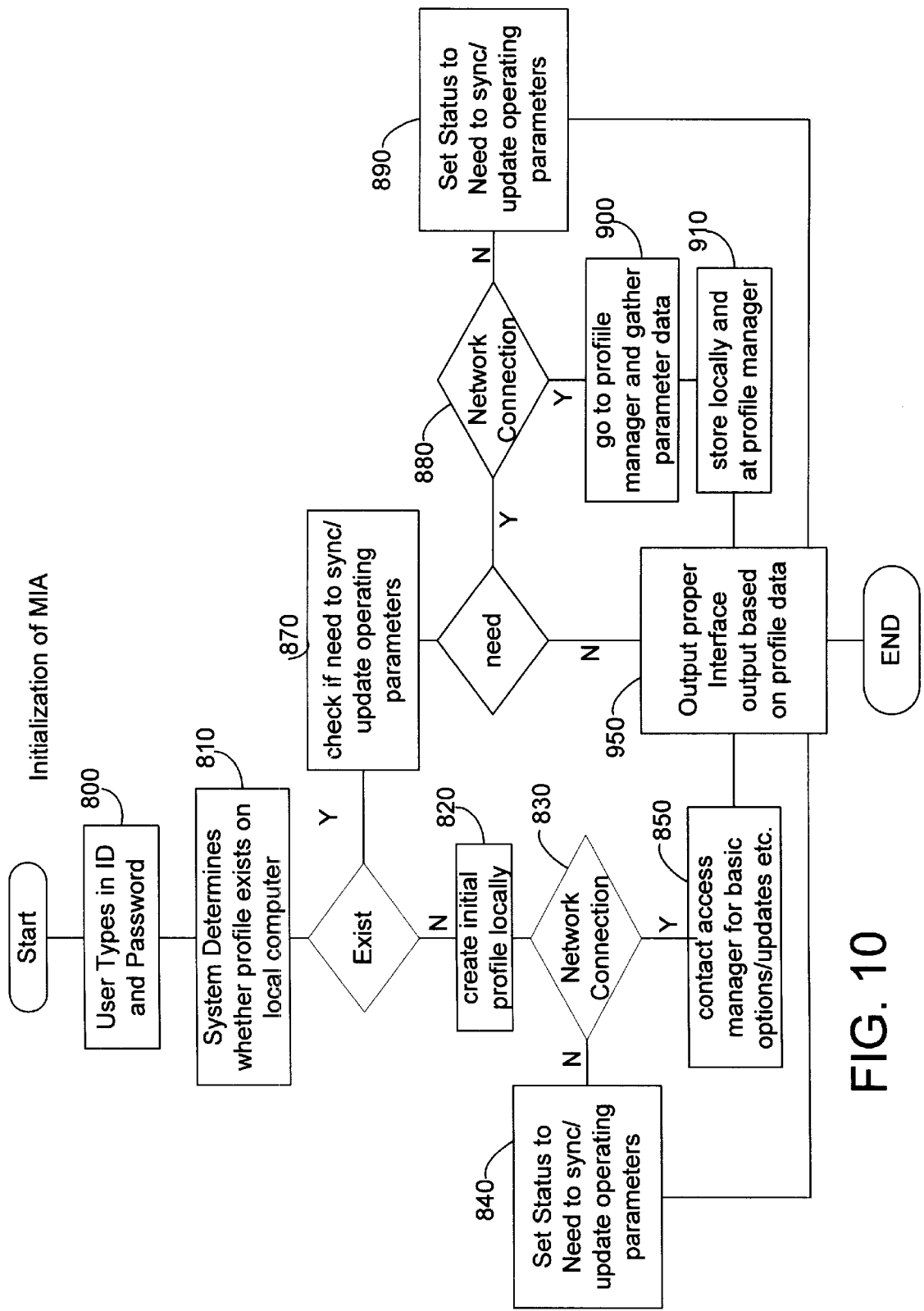
FIG. 10 illustrates a flow chart for initializing and creating a mobile interface agent in accordance with the present invention.

FIG. 10 illustrates a flow chart for initializing and creating a mobile interface agent in accordance with the present invention. In step 800, a user will input a user id number and a user password to begin accessing the MIA. The user can connect to the logon screen via the Internet or any other network connection. An example of a sample logon screen was illustrated in FIG. 1a. A user enters his ID and password on any machine of any platform that can implement the MIA 102. The option bar may be used to spawn another MIA client or to implement other features accessible outside of user login. Alternatively, the user may have a pre-configured ID associated with a device such as in the case of a cellular phone and thus may not require keyed input of a user ID.

Once the user has logged on, FIG. 1b again illustrates a graphic interface used by a MIA 102 once a user has logged on. In this example, a set of menu's associated with a user's specific configuration and profile is shown. MIA options are accessed through the menu system. In addition to a simple menu interface, a user can elect to associate a graphical icon such as a teddy bear graphical icon or other figure to the menu system.

Next, the system implementing the MIA 102 will determine whether a profile exists on the local computer for the user in step 810. If a user profile does not exist for the user, then a profile is created locally for the user in step 820. After creating the initial user profile, the next step is to determine whether the network connection is established in step 830. In step 850, if a network connection has been established, the MIA 102 contacts the profile manager 134 and determines whether the user id and password entered in step 800 is registered, unless the user has selected an option to not authenticate on each use. If the user is authenticated, then the MIA 102 downloads the appropriate information such as user profile, URL links, applications registered, etc. Some of the information downloaded may depend on the platform, geographical location, etc. that corresponds to the user's connection location. For example, if a user has purchased a Windows 98 only license for MS Word and moved to an Apple MacOS device, then the MS Word menu item may be disabled or not downloaded. As another example, if a user using a cellular phone has not purchased the *69 callback feature then the voice command "Callback" may be disabled. As yet another example, if the user is shown to be connecting from an IP address known to be in a certain geographical region, or if the user has entered geographical information of a certain country, then advertising information specific to that country or region can be downloaded. The subset of information downloaded can depend on quite a number of variables and downloaded information may be filtered even further by filter 210.

If, on the other hand, the network connection in step 830 is not established, then the MIA 102 sets some status to indicate that there is a need to synchronize and update the operating parameters in step 840.

If the system determines that a profile exists in step 810, the system checks to determine whether the operating parameters need to be synchronized and/or updated in step 870. If no synchronizing or updating is required, then the appropriate output based on state variables such as network connection, platform, or geographic region of MIA is transmitted to the user based on the user profile data in step 950. If, on the other hand, the system determines that operating parameters need to be synchronized and updated, the system determines whether a network connection is established in step 880. If no network connection is detected, then the MIA 102, in step 890, will set state information requiring the MIA 102 to synchronize/update it's profile information with the profile manager 134 once a network connection is detected. If the network connection has been detected, then the MIA 102 will, in step 900, contact the profile manager 134 and download all of the required user profile, application, etc. data. In step 910, the profile manager 134 may update it's own information such as last log in time, last connected IP address, last synchronization time, etc. Thereafter, an appropriate output is displayed to the user is step 950.

Figure 11:
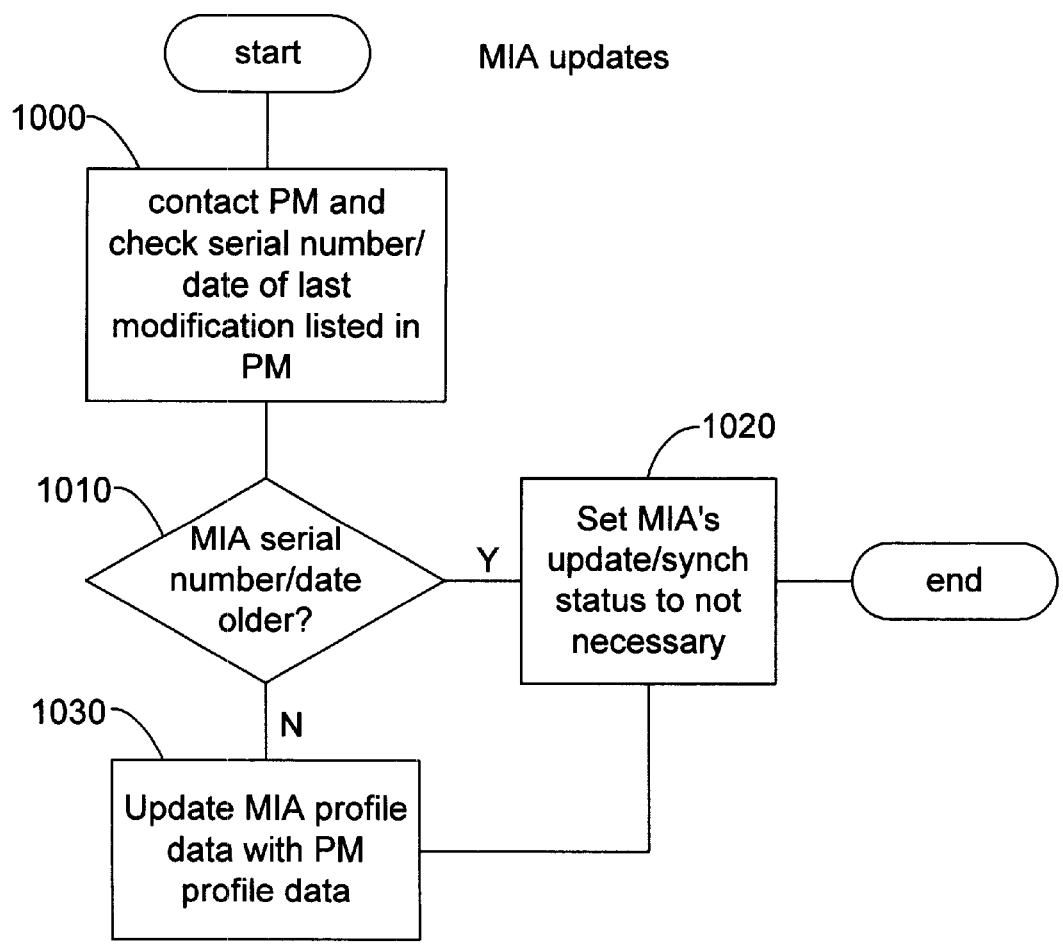
FIG. 11 illustrates a flow chart for synchronizing and updating a user profile in accordance with the present invention.

FIG. 11 illustrates a flow chart for synchronizing and updating a user profile in accordance with the present invention. This flow chart illustrates the process for synchronizing and updating a user profile data that is stored in the profile manager database and in the local memory database using the MIA.

In step 1000, the MIA will contact the profile manager and check the serial number and/or date of the last modification listed in the profile manager database. If the MIA serial number or date is older than the most recently updated serial number or date in step 1010, the MIA may be configured to not update or synchronize it's information in step 1020. If, on the other hand, the MIA serial number or date is not older, then the MIA profile data is updated with the profile manager profile data in step 1030. After such updating, setting the MIA's update/synchronize status is not necessary as indicated in step 1020.

Figure 12:
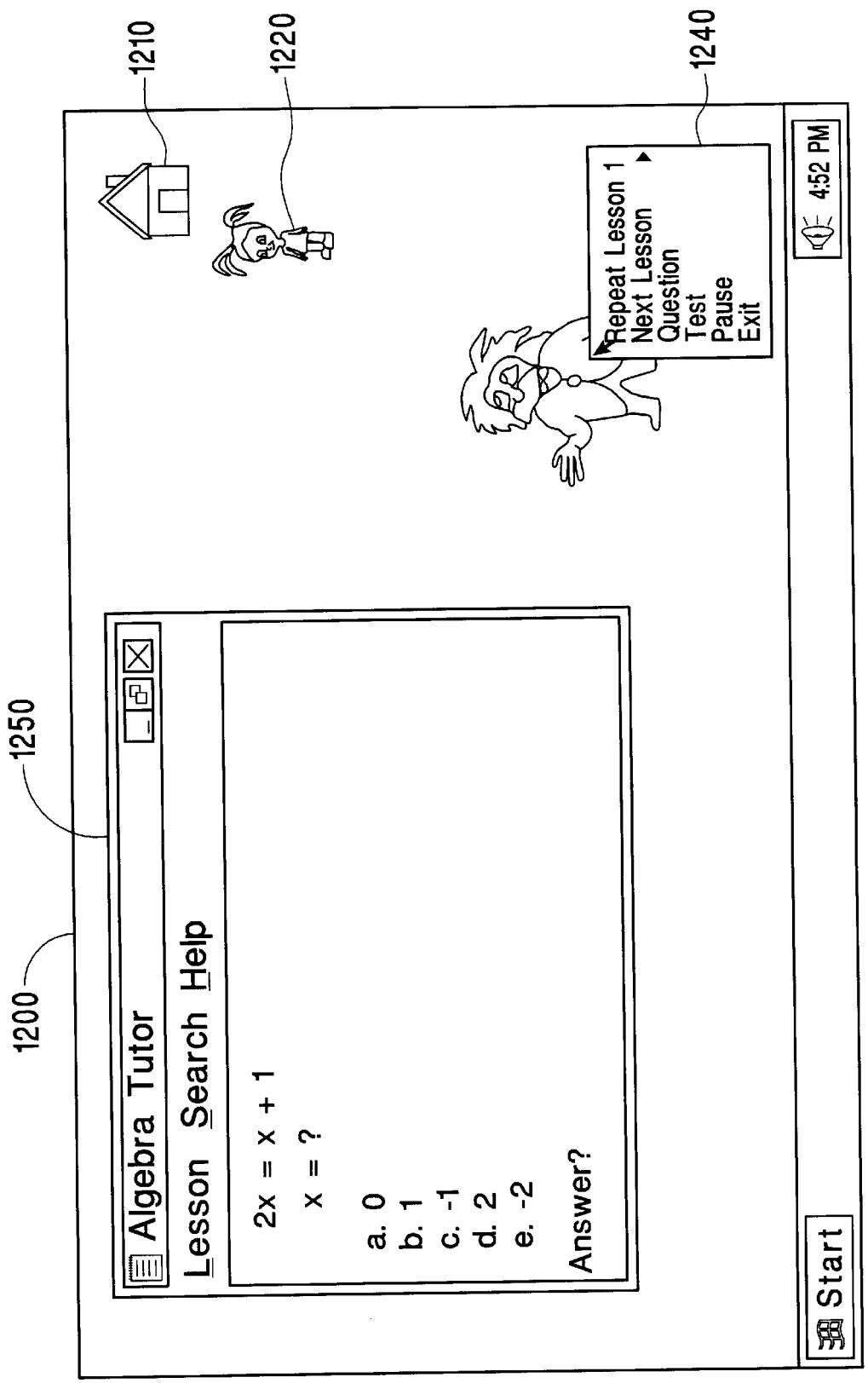
FIG. 12 illustrates a graphical mobile interface agent and a visiting graphical mobile interface agent used for educational purposes on a user interface screen in accordance with the present invention.

FIG. 12 illustrates a graphical mobile interface agent on a user interface screen in accordance with the present invention. A graphical figure representing a MIA 1220 and a home 1210 is displayed in the screen 1200. Left clicking on the MIA 1220 will display the list of MIA menu options shown in FIG. 1b.

Also illustrated is a visiting MIA 1230 named Professor Math. This MIA has a subset of MIA functionality and can be used to access specific options such as executing a link to a lesson such as an Algebra Tutor application 1250. The visiting MIA 1230 could first appear and "knock" on the MIA home 1210 to gain access. to a user's desktop 1200. The user may then have a list of available responses such as: (1) allow Professor Math 1230 to enter; (2) ask Professor Math 1230 to go away; or, (3) send a message to Professor Math 1230 to come back later. Educational lessons can be downloaded to a MIA's 1220 local site or can be remotely accessed via the visiting MIA 1230.

By associating a lifelike graphical icon such as the MIA 1220 character attributes can be associated with the MIA such as strength, personality, etc. Further some kind of status bar could be provided with information concerning the MIA 1220 as well as other MIAs. The MIA status bar could also include advertisements from advertisers.

Figure 13:
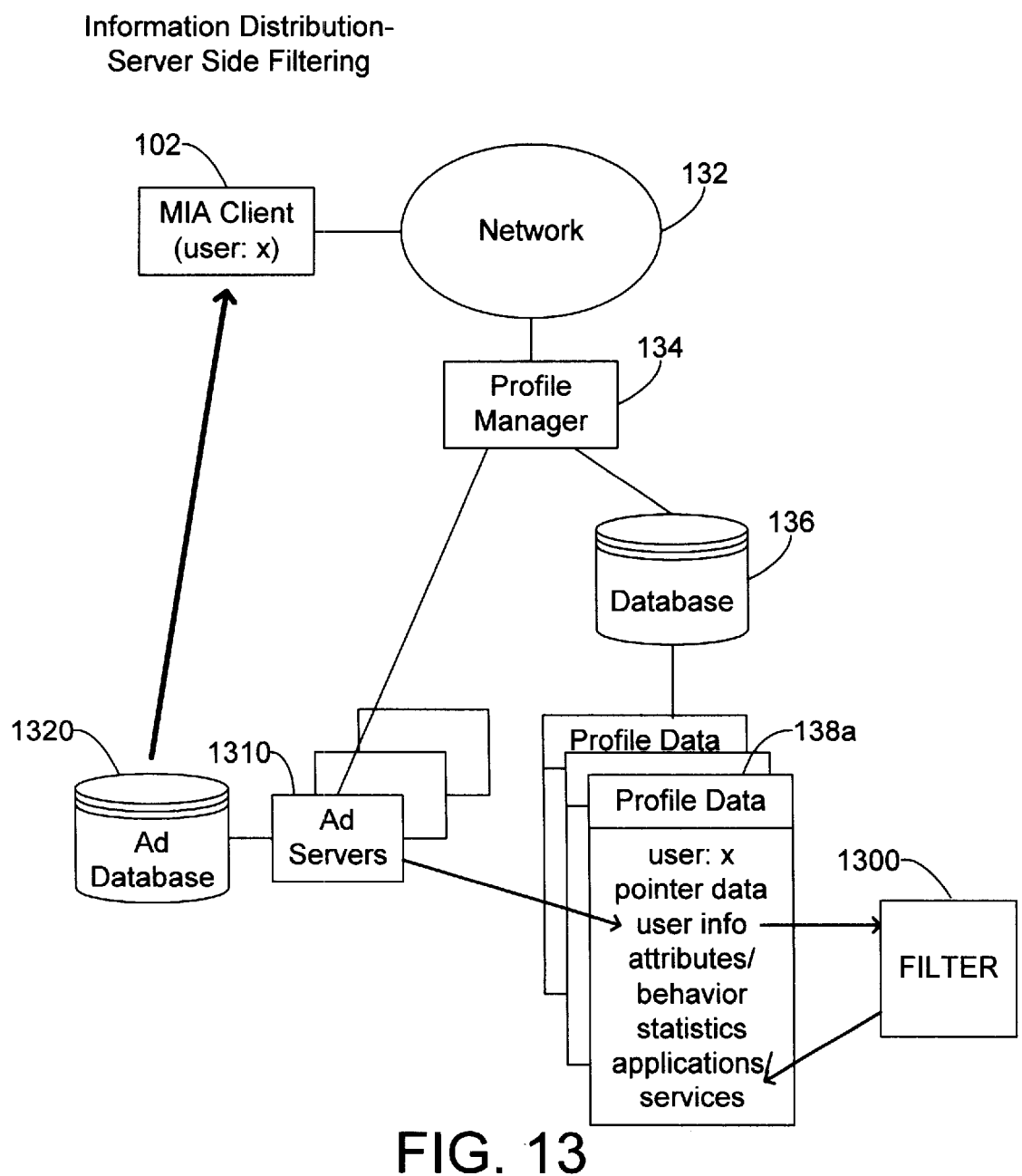
FIG. 13 illustrates an implementation of the present invention having an information distribution with client side filtering.

FIG. 13 illustrates an implementation of the present invention having a third party server communicating with the profile manager. In this embodiment, information distribution is performed on the server side. The example provided herein shows advertisement servers 1310 coupled to the profile manager 134. The ads will have characteristics and keywords associated with them. The ad server 1310 via the profile manager 134 checks the profile data 138a to determine whether users want advertising and if so what kinds of advertising they are interested in. The user information can be very sophisticated and be used to target a very specific audience. A filter 1300 is used to determine which users receive what advertisements. Then the Ad server 1310 places links in the profile data 138a specifically in his/her applications/services area about advertising information. The links will be pointers to the full advertisement in Ad database 1320. The MIA 102 then at some later point can retrieve particular ads and display them to the user through an output source.

Figure 14:
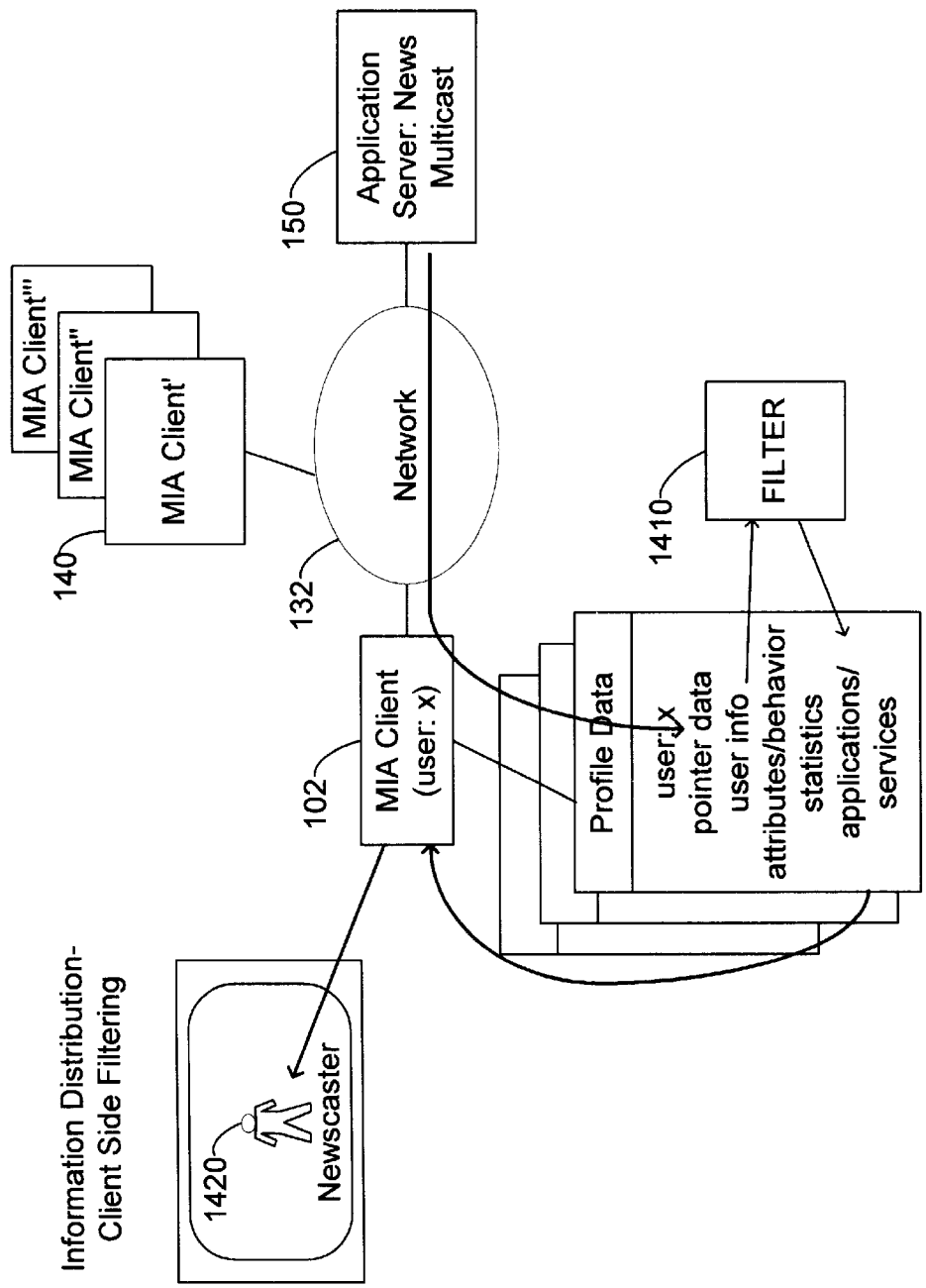
FIG. 14 illustrates an implementation of the present invention having a third party server communicating with the profile manager.

FIG. 14 illustrates an implementation of the present invention having an information distribution with client side filtering. In this example, the AppServ server 150 is serving a news feed via a multicast connection to MIA 102 as well as a plurality of other MIAs 140 through the network 132. The MIA 102 accepts the multicast stream but filters the data based on Profile Data 138b kept in the MIA's local memory 106. Thus only a desired subset of multicast news stream data is stored into the local applications/services memory by filter 1410. Later a user may launch a news program in which a newscaster 1420 reads the news stored in local memory 106. The environment the newscaster reads news from could be a PC desktop, a set top box, a mobile telephone, or any other environment that the MIA 102 can run.

Figure 15:
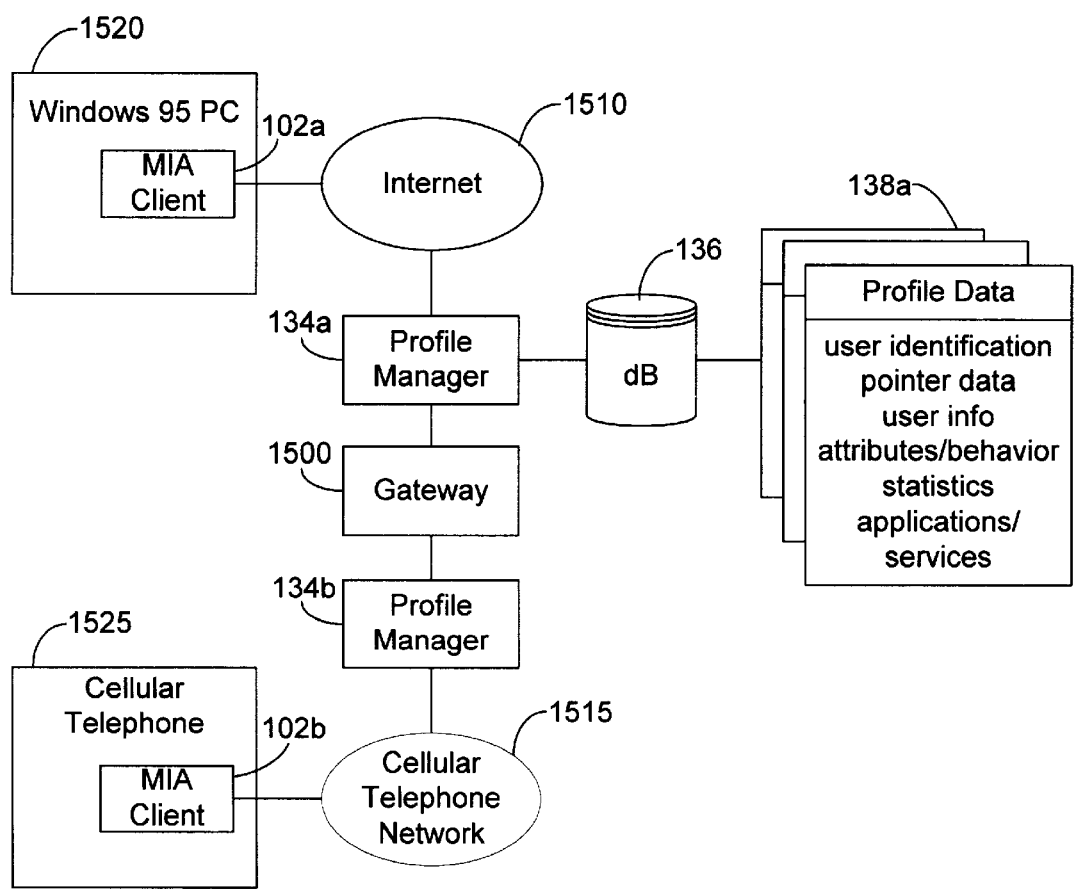
FIG. 15 illustrates an implementation of the present invention having profile managers of multiple communication networks connected by a gateway.

FIG. 15 illustrates an implementation of the present invention having profile managers of multiple communications networks connected via a gateway. In this example, a MIA 102a is running on a Windows 95 PC 1520 connected to the Internet 1510. The MIA 102a connects to the profile manager 134a via the Internet 1510 and saves a list of telephone numbers inputted by the user to her MIA 102a. The telephone numbers are subsequently stored in the profile manager database 136 and into the user's profile data 138a.

The gateway 1500 is used to interface certain user profile information or application data from the profile manager 134a connected to the Internet 1510 to the profile manager 134b connected to the cellular telephone network 1515. The cellular telephone network 1515 is connected to MIA 102b which resides as part of the cellular telephone 1525. In this example, the MIA 102b can download the telephone numbers that a user using MIA 102a had originally inputted in her Windows 95 PC 1520 to program telephone numbers accessible via the cellular telephone 1525.

Similarly, this concept can be extended to other types of networks. For example, a user can use a listing of television program listings configured on a MIA running on a PC connected to the Internet to program a cable set top box on a cable television network. As another example, a cable set top box user on a cable television network could use a MIA to record viewing habits. This information could later be transferred from the cable television network profile manager, via a gateway, to a profile manager running on the Internet and be used to determine the types of web banner advertising a user would be interested in viewing.

In the previous descriptions, numerous specific details are set forth to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiment are possible without materially departing from the novel teachings and advantages of this invention.

I claim:

1. A method for retrieving user specific resources and information stored either on a local device or a network server, the method comprising the steps of:
    retrieving a mobile interface from the network server to the local device;
    displaying the mobile interface on the local device, the mobile interface including a plurality of pointers corresponding to the user specific resources and information; and
    retrieving the user specific resources and information using the plurality of pointers displayed on the mobile interface.

2. A method according to claim 1, wherein the user specific resources and information comprise programs, applications, files, documents, bookmarked URLs, and user profiles.

3. A method according to claim 1, wherein the user specific resources and information comprise television channels.

4. A method according to claim 1, wherein the user specific resources and information comprise telephone numbers.

5. A method according to claim 1, wherein the user specific resources and information comprise television program listings.

6. A method according to claim 1 further comprising the step of licensing the user specific resources to a user based on a per user licensing model.

7. A method according to claim 1, wherein the step of retrieving the mobile interface from the network server comprises the step of retrieving the mobile interface agent user profile and configuration data via the Internet.

8. A method according to claim 1, wherein the step of retrieving the mobile interface from the network server comprises the step of retrieving the mobile interface via one of a LAN, a MAN, and a WAN.

9. A method according to claim 1, wherein the step of retrieving the mobile interface from the network server comprises the step of retrieving the mobile interface via a cellular network.

10. A method according to claim 1, wherein the step of retrieving the mobile interface from the network server comprises the step of retrieving the mobile interface via a television network.

11. A method for retrieving user specific resources and information stored either on a local device or a network server, the method comprising the steps of:
    displaying the mobile interface on the local device, the mobile interface including a plurality of pointers corresponding to the user specific resources and information;
    retrieving user profile and configuration data from the network server to the local device, wherein the user profile and configuration data is used to update the data associated with the mobile interface;
    retrieving the user specific resources and information using the plurality of pointers displayed on the mobile interface.

12. A method according to claim 11, wherein the user specific resources and information comprise programs, applications, files, documents, bookmarked URLs, and user profiles.

13. A method according to claim 11, wherein the user specific resources and information comprise television channels.

14. A method according to claim 11, wherein the user specific resources and information comprise telephone numbers.

15. A method according to claim 11, wherein the user specific resources and information comprise television program listings.

16. A method according to claim 11 further comprising the step of licensing the user specific resources to a user based on a per user licensing model.

17. A method according to claim 11, wherein the step of retrieving the user profile and configuration data from the network server comprises the step of retrieving the user profile and configuration data via the Internet.

18. A method according to claim 11, wherein the step of retrieving the user profile and configuration data from the network server comprises the step of retrieving the user profile and configuration data via one of a LAN, a MAN, and a WAN.

19. A method according to claim 11, wherein the step of retrieving the user profile and configuration data from the network server comprises the step of retrieving the user profile and configuration data via a cellular network.

20. A method according to claim 11, wherein the step of retrieving the user profile and configuration data from the network server comprises the step of retrieving the user profile and configuration data via a television network.

21. A method according to claim 11 further comprising exporting user profile and configuration data from a first network to a second network.

22. A method according to claim 21, wherein the first network comprises an Internet network and the second network comprises one of a cellular network and a telephone network.

23. A method according to claim 21, wherein the first network comprises one of a cellular network and a telephone network and the second network comprises an Internet network.

24. A method according to claim 11, wherein the step of displaying the user interface on the local network comprises the step of audioly presenting the user interface on a cellular device.

25. A mobile interface used for accessing user specific resources and information stored either on a local computer device or a network server, the mobile interface comprising:
    means for interfacing any local computer device with the network server;
    means for presenting a plurality of pointers on any local device corresponding to the user specific resources and information to a user; and
    means for accessing the user specific resources and information using the plurality of pointers.

26. A mobile interface according to claim 25, wherein the user specific resources and information comprise programs, applications, files, documents, bookmarked URLs, and user profiles.

27. A mobile interface according to claim 25, wherein the user specific resources and information comprise television channels.

28. A mobile interface according to claim 25, wherein the user specific resources and information comprise telephone numbers.

29. A mobile interface according to claim 25, wherein the user specific resources and information comprise television program listings.

30. A mobile interface according to claim 25, wherein the plurality of pointers access the user specific resources and information stored on the network server via the Internet.

31. A mobile interface according to claim 25, wherein the plurality of pointers access the user specific resources and information stored on the network server via one of a LAN, a MAN, and a WAN.

32. A mobile interface according to claim 25, wherein the plurality of pointers access the user specific resources and information stored on the network server via a cellular network.

33. A mobile interface according to claim 25, wherein the plurality of pointers access the user specific resources and information stored on the network server via a television network.

34. A mobile interface used for retrieving user specific resources and information stored either on a local device or a network server, the mobile interface being adapted to move from one local device to another and adapted to be displayed on the local device, the mobile interface comprising:
   a plurality of pointers that correspond to the user specific resources and information, wherein upon initiating a pointer, a user specific resource or information from either the local device or the network server is retrieved.

35. A mobile interface according to claim 34, wherein the user specific resources and information comprise programs, applications, files, documents, bookmarked URLs, and user profiles.

36. A mobile interface according to claim 34, wherein the plurality of pointers access the user specific resources and information stored on the network server via the Internet.

37. A mobile interface according to claim 34, wherein the plurality of pointers access the user specific resources and information stored on the network server via a cellular network.

38. A mobile interface according to claim 34, wherein the plurality of pointers access the user specific resources and information stored on the network server via a television network.

39. A mobile interface according to claim 34, wherein the user specific resources is retrieved based on a per user licensing model.

40. A system for storing and accessing user specific resources and information, the system comprising:
   a network for accessing the user specific resources and information stored in a network server; and
   a local device communicating with the network and having a local memory and a mobile interface, wherein the local memory also includes user specific resources and information, and the mobile interface includes pointers corresponding to the user specific resources and information that are stored either on the local device or the network server, wherein the pointers provide links to access the corresponding user specific resources and information.

41. A system according to claim 40, wherein the user specific resources and information comprise programs, applications, files, documents, bookmarked URLs, and user profiles.

42. A system according to claim 40, wherein the plurality of pointers access the user specific resources and information stored on the network server via the Internet.

43. A system according to claim 40, wherein the plurality of pointers access the user specific resources and information stored on the network server via one of a LAN, a MAN, and a WAN.

44. A system according to claim 40, wherein the plurality of pointers access the user specific resources and information stored on the network server via a cellular network.

45. A system according to claim 40, wherein the plurality of pointers access the user specific resources and information stored on the network server via a television network.

46. A system according to claim 40, wherein the user specific resources is retrieved based on a per user licensing model.

47. A system according to claim 40, wherein the mobile interface is adapted to be loaded onto the local device from any geographical location so long as the local device is communicating with the network server.

48. A system according to claim 40, wherein the mobile interface is permanently stored in the network server.

49. A system providing a user access to a user specific resource or information using a local device capable of connecting to a network, the user specific resource or information being stored either on the local device or a network server, the system comprising:
   means for connecting the local device to the network server;
   means for downloading a mobile interface from the network server to the local device;
   means for displaying the mobile interface on the local device;
   means for inputting a request for the user specific resource or information through the mobile interface displayed on the local device;
   means for retrieving the requested user specific resource or information from either the local device or the network server; and
   means for displaying the requested user specific resource or information on the local device.

* * * * *